Aug. 27, 1968  E. R. SCHICKLE  3,398,842
APPARATUS FOR TRANSFERRING BEER KEGS FROM
STORAGE TO A CONVEYOR
Filed Feb. 11, 1966  4 Sheets-Sheet 4

INVENTOR.
ERNST R. SCHICKLE
BY
ATTORNEY.

United States Patent Office
3,398,842
Patented Aug. 27, 1968

3,398,842
APPARATUS FOR TRANSFERRING BEER KEGS FROM STORAGE TO A CONVEYOR
Ernst R. Schickle, Tappan, N.Y., assignor to Rheingold Breweries, Inc., Brooklyn, N.Y., a corporation of New York
Filed Feb. 11, 1966, Ser. No. 526,831
9 Claims. (Cl. 214—16)

ABSTRACT OF THE DISCLOSURE

Beer keg handling system for breweries or the like in which a plurality of rows of erect kegs received from storage are propelled toward terminally located transfer devices operative to receive the erect keg first in line in each row and to transfer such kegs into prone predetermined spaced relation on a common delivery conveyor in response to the need for such kegs to maintain an adequate supply thereof for a downstream operation thereon.

---

This invention relates generally to the handling of beer kegs or barrels in a brewery, and is particularly directed to apparatus for transferring beer kegs from storage to a conveyor, for example, as in a keg handling system as described in my copending application Ser. No. 526,784, filed Feb. 11, 1966, now Patent No. 3,370,720.

In the usual operation of a brewery, empty kegs are returned to the brewery in varying quantities during limited and random time periods which cannot be correlated with the necessary continuous keg washing and refilling operations. Thus, at certain periods, it is necessary to store varying quantities of the kegs as they are returned to the brewery. The stored kegs are preferably arranged in erect positions, that is standing on ends thereof, so as to permit stacking of the kegs and thereby minimize the floor space required for keg storage. From time to time, for example, when the rate at which empty kegs are then being returned to the brewery is less than the rate at which kegs are being washed and refilled, kegs are removed from storage for feeding in prone positions to one or more keg washers so as to continuously maintain an adequate supply of kegs at the inlet to each keg washer during the period of operation thereof and thereby permits continuous operation of the keg washers and the following rackers or keg filling machines at their optimum rates.

Due to the number and bulk of the kegs involved, the transfer of the kegs removed from storage onto a delivery conveyor for transport to the inlet of each operative keg washer gives rise to serious problems as concerns attempts to reduce the operating costs of the brewery by eliminating, wherever possible, manual handling of the kegs.

Accordingly, it is an object of this invention to provide apparatus by which beer kegs removed from storage can be automatically transferred to a delivery conveyor which, for example, carries the kegs to one or more keg washers.

Another object is to provide an apparatus of the described character which accepts kegs removed from storage in convenient groupings and operates to separate kegs from such groups and to dispose the separated kegs in succession on the delivery conveyor.

Still another object is to provide an apparatus of the described character which transfers kegs received from storage in erect positions to prone positions on the delivery conveyor so as to facilitate transport of the kegs on the conveyor and subsequent removal of the kegs from the delivery conveyor either at a keg distributing station or at the inlet to a keg washer.

A further object is to provide an apparatus of the described character which operates automatically to transfer kegs removed from storage to the delivery conveyor in response to the need for such kegs to maintain an adequate supply thereof on a section of the conveyor leading to the keg washer or other machine to which kegs are being fed.

In accordance with an aspect of the invention, kegs removed from storage in groupings made up of rows of kegs are placed in erect positions on a support and propelled in the directions of the rows toward one end of the support at which downending means is operative to receive the erect keg first in line in each row and to transfer such keg to a prone position for discharge by way of a guide onto a section of the delivery conveyor, and the operation of the downending means is initiated in response to the absence of kegs on such section of the delivery conveyor.

In accordance with another feature of the invention a downending device is provided for each row of kegs on the support and the guides extending from the downending devices open onto the keg receiving section of the delivery conveyor at locations spaced apart therealong, and further the downending devices are operated successively in a sequence which is the same as the order of the locations at which the respective guides open onto the delivery conveyor considered in the direction opposed to the movement of the latter, thereby to ensure spacing apart of the prone kegs on the keg receiving section of the delivery conveyor.

In accordance with still another feature of this invention, the movement of the delivery conveyor is halted when the kegs thereon close together, for example, when kegs are taken off the conveyor for feeding to a keg washer or otherwise at a rate less than that at which kegs are transferred to the delivery conveyor at its keg receiving section, whereby one or more kegs remain on the said section to halt operation of the downending devices.

The above, and other objects, features and advantages of the invention, will be apparent in the following detailed description of an illustrative embodiment thereof which is to be read in connection with the accompanying drawings, wherein.

Figure 1:
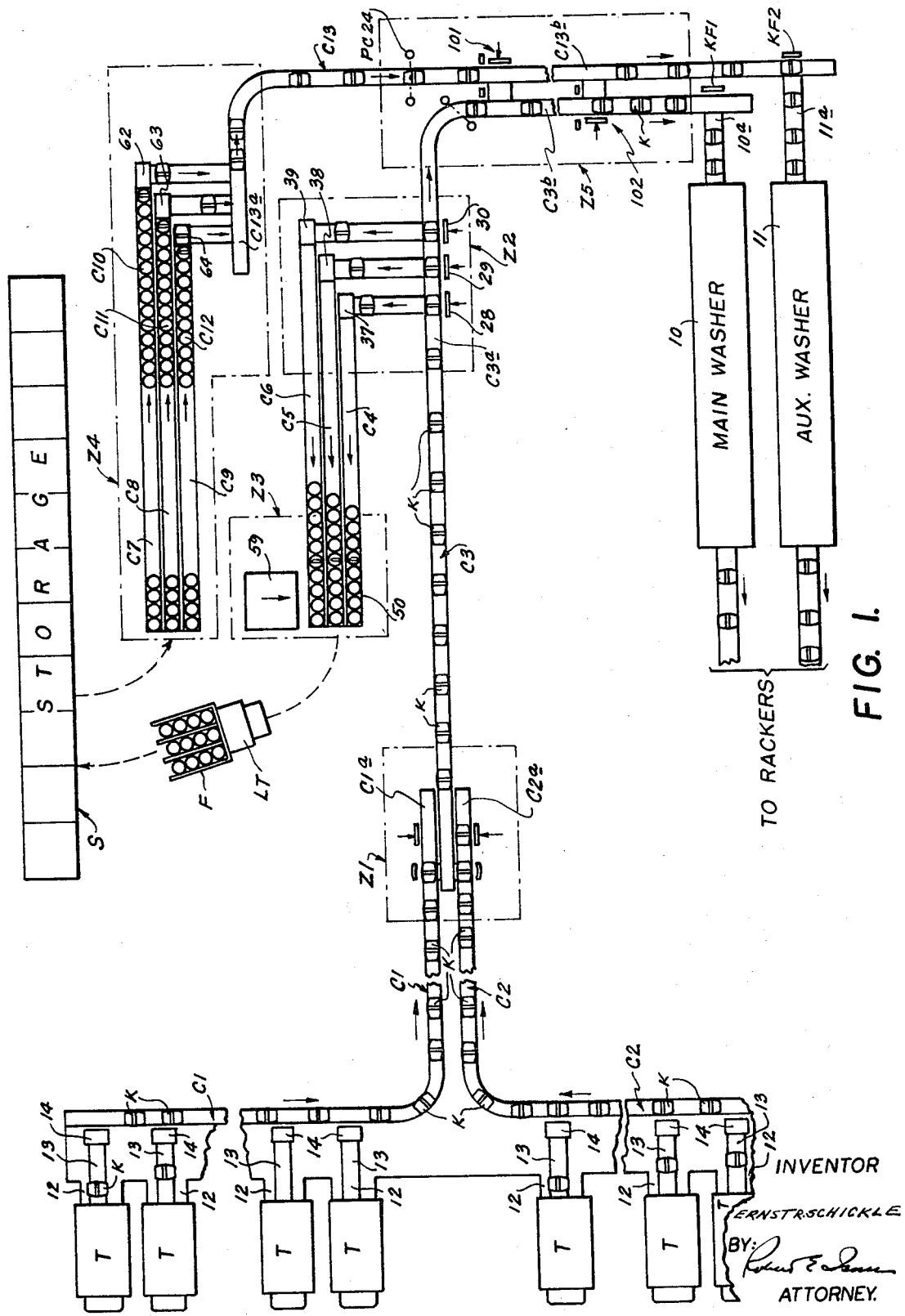
FIG. 1 is a diagrammatic view illustrating the movement of kegs in a brewery by a keg handling system that includes an apparatus in accordance with this invention.

Referring to the drawings in detail, it will be seen that FIG. 1 schematically illustrates a system for handling empty kegs K returned to a brewery by trucks T or other conveyances, and which is disclosed in detail in the copending application for U.S. Letters Patent, Ser. No. 526,-784, of even date herewith. In such system, the empty kegs are unloaded from trucks T at a number of docks or bays 12 onto inclined or other feeding conveyors 13. Automatic keg feeders 14 deposit the kegs from inclined conveyors 13 onto available spaces on keg receiving conveyors C1 and C2 which move past respective groups of the docks 12 and carry the kegs to a transfer zone Z1. At zone Z1, kegs transported by terminal sections C1a and C2a of conveyors C1 and C2 are transferred in spaced apart relation onto a main delivery conveyor C3.

The main delivery conveyor C3 has a section C3a passing through a keg removing zone Z2, and a terminal section C3b extending to a keg feeder KF1 which feeds the kegs successively arriving at the terminus of section C3b to an inlet 10a of a main keg washer 10. If the rate at which keg feeder KF1 feeds kegs to inlet 10a is less than that at which kegs are advanced from conveyor section C3a to section C3b, so that the kegs become congested on conveyor section C3b, devices 28, 29 and 30 are operated to laterally remove prone kegs from conveyor section C3a in zone Z2 and the removed kegs roll into, or are otherwise received by upending devices 37, 38 and 39 which transfer the kegs from their prone positions to erect positions on accumulating conveyors C4, C5 and C6, as disclosed in detail in copending application for U.S. Letters Patent Ser. No. 526,784, of even date herewith. Further, as disclosed fully in the last mentioned application conveyors C4, C5 and C6 carry the erect kegs thereon to a zone Z3 at which convenient groupings of kegs, for example, twelve kegs arranged in three rows of four kegs each, are accumulated successively on a table 50.

After each grouping of kegs on table 50 is completed, a slip board, for example, a sheet of plywood may be placed on top of the grouping of kegs either manually or by a slip board dispenser indicated at 59.

The removal of the complete grouping of kegs from table 50 to a suitable storage area S may be effected by a lift truck LT having a fork F with four spaced tines to engage under the usual enlarged cylindrical central portions of the kegs in the three rows of the complete grouping. Since the kegs are erect in the grouping removed from table 50, such kegs will occupy a minimum space when placed in storage area S, and further make it possible to stack successive groupings of kegs one upon the other so as to minimize the floor area required for storage.

During a period when the empty kegs being returned to the brewery and transported by conveyors C1 and C2 to main delivery conveyor C3 are inadequate to satisfy the demand for kegs at main washing apparatus 10 and/or at an auxiliary washing apparatus 11, or if washing apparatus 10 and/or 11 is operated at a time when no empty kegs are being returned, then kegs must be removed from storage area S and placed upon an auxiliary delivery conveyor C13 for feeding to one or both of the keg washers.

In accordance with this invention, an apparatus identified generally at Z4 is provided for automatically transferring the kegs removed from storage onto delivery conveyor C13. Such apparatus is shown to include an elongated degrouping table 60 having parallel spaced guides 61 defining three parallel tracks or paths for receiving the rows of kegs in successive groupings of kegs removed from storage area S, for example, by lift truck LT, and placed on table 60.

The kegs placed on table 60 constitute a ready supply of kegs to be transferred by downending devices 62, 63 and 54 to a keg receiving section C13a of delivery conveyor C13 which further has a terminal section C13b extending to a keg feeder KF2 operative to feed kegs to an inlet 11a of washing apparatus 11.

Figure 2:
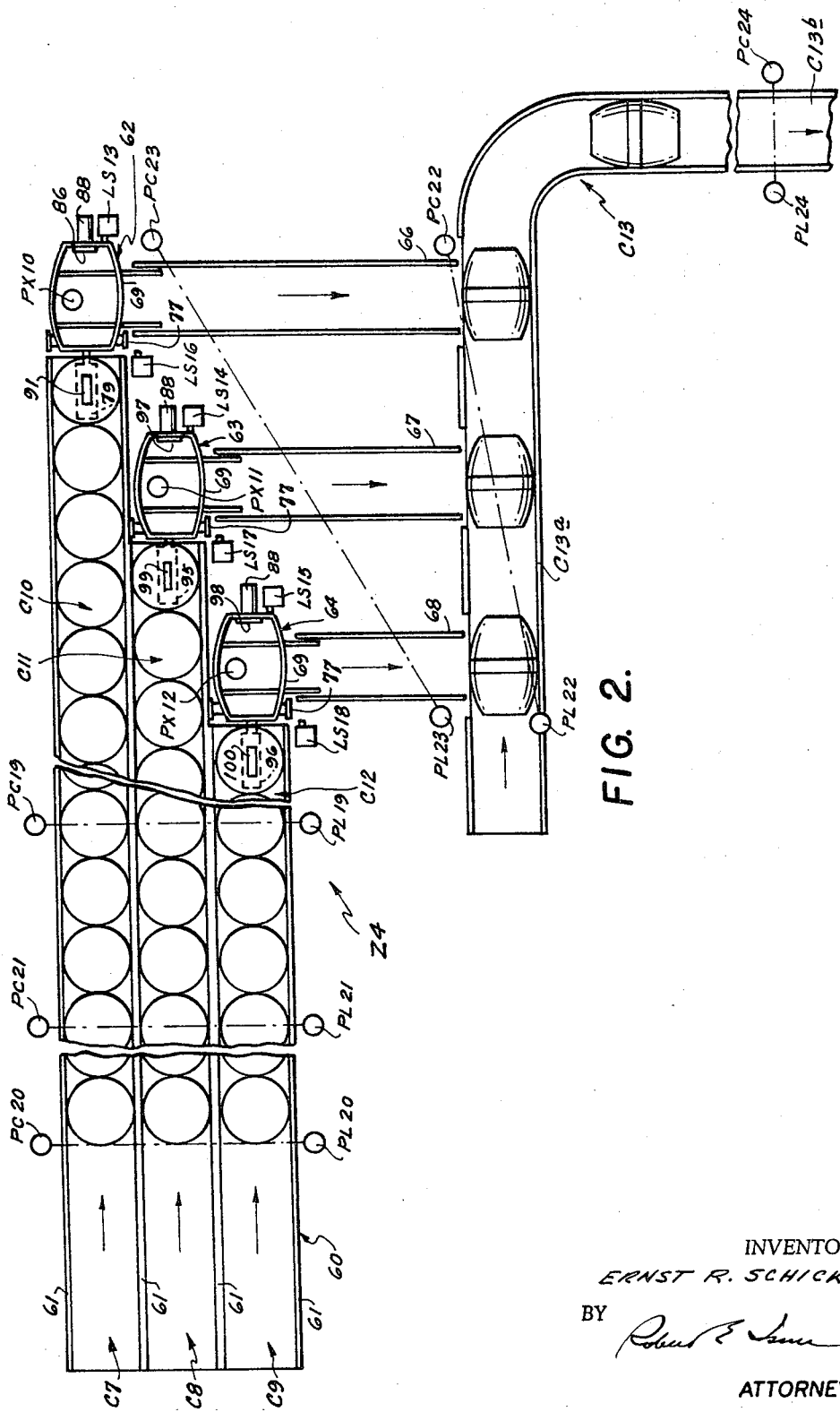
FIG. 2 is a schematic view of the apparatus in accordance with this invention.

The three rows of kegs on table 60 are transported by infeed conveyors C7, C8 and C9 and then by conveyors C10, C11 and C12, respectively, in the direction toward downending devices 62, 63 and 64 (FIG. 2). The conveyors C7, C8 and C9 are all driven by a motor MC7, 8, 9 (FIG. 3) having an energizing circuit in which a manually closed switch SS2 is connected in series with a photocell PC19 constituting a normally closed switch. In referring to photocell PC19 as constituting a normally closed switch, it is meant that the associated contacts are closed so long as a light beam aimed at such photocell is not interrupted, and that interruption of the light beam, as by a keg, causes opening of the switch contacts. Hereinafter, the same meaning will be intended wherever reference is made to photocells constituting normally closed switches.

Conversely, photocells identified as constituting normally open switches will be those having contacts that are open so long as the associated light beam is not interrupted, and in which interruption of the light beam causes closing of the switch contacts.

An alternate circuit for energizing motor MC7, 8, 9 is provided through a normally open contact PC20a of a photocell PC20 and a normally closed switch constituted by a photocell PC21 which are in parallel with the switch constituted by photocell PC19. As shown in FIG. 2, photocell PC19 has a light beam aimed thereat across table 60 from a light source PL19 and is located approximately midway between the ends of conveyors C10, C11 and C12. Thus, the switch constituted by photocell PC19 completes the circuit for driving conveyors C7, C8 and C9 and thereby causes kegs to be advanced onto conveyors C10, C11 and C12 whenever the kegs held in readiness on the latter for feeding to downending devices 62, 63 and 64 have been reduced below a predetermined number, that is, when the light beam aimed at photocell PC19 is not interrupted. Photocell PC21 also has a light beam aimed thereat laterally across table 60 from a light source PL21 and is spaced from photocell PC19 in the direction opposed to the movement of conveyors C10, C11 and C12 by a distance approximately equal to the space required on table 60 for each grouping of kegs. Photocell PC20 is located adjacent the infeed end of table 60 so that a light beam aimed laterally across the table at photocell PC20 by a light source PL20 is interrupted by the grouping of kegs removed from storage and placed on table 60, and such light beam is uninterrupted when an adequate space is available at the infeed end of table 60 to receive a new grouping of kegs.

By reason of the foregoing positioning and arrangement of photocells PC19, PS20 and PC21, infeed conveyors C7, C8 and C9 are driven to advance kegs thereon to conveyors C10, C11 and C12 respectively whenever photocell PC19 detects the reduction of the kegs on the delivery conveyors below a predetermined number, or whenever a new grouping of kegs is placed on the infeed end of table 60 so as to be detected by photocell PC20 and photocell PC21 simultaneously detects the presence of space on the conveyors C10, C11 and C12 for receiving additional kegs from the related infeed conveyors.

Figure 3:
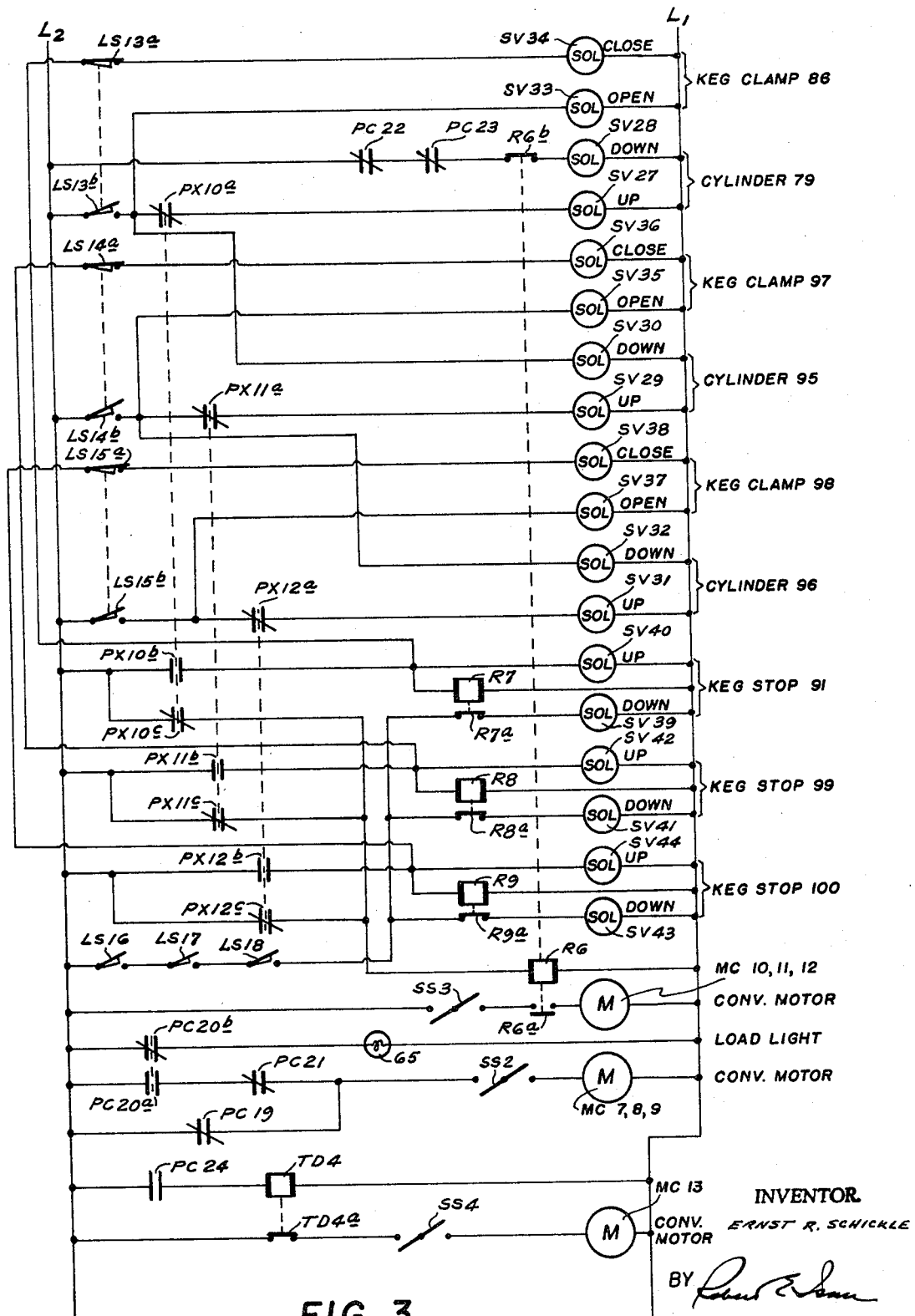
FIG. 3 is a schematic wiring diagram showing the controls associated with the apparatus of FIG. 2.

As shown on FIG. 3, photocell PC20 may be further provided with a normally closed contact PC20b interposed in an energizing circuit for a signal light 65 so that the latter is illuminated whenever the light beam aimed at photocell PC20 is interrupted. Thus, illumination of signal light 65 indicates to the operator of lift truck LT that there is adequate space at the infeed end of table 60 for the reception of a grouping of keys removed from storage.

The downending devices 62, 63 and 64 are provided to transfer the keys first in line on conveyors C10, C11 and C12 from their erect positions on such conveyors into prone positions and to discharge the prone kegs by way of inclined conveyor rails 66, 67 and 68 onto keg receiving section C13a of delivery conveyor C13.

Figure 5:
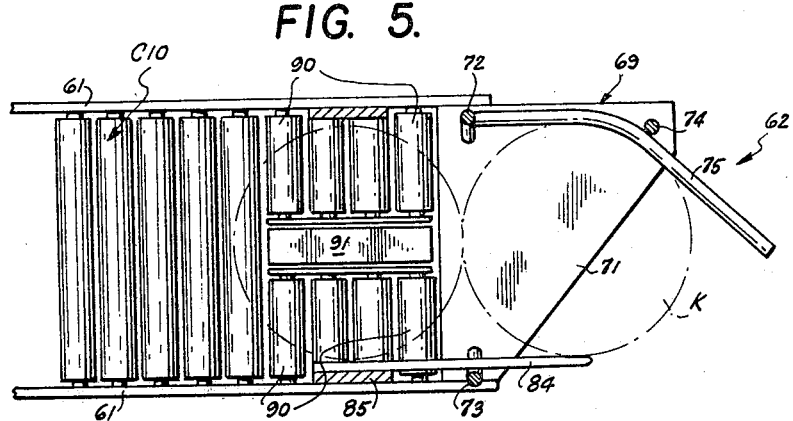
FIG. 5 is a sectional view taken along the line 5—5 on FIG. 4.
Figure 4:
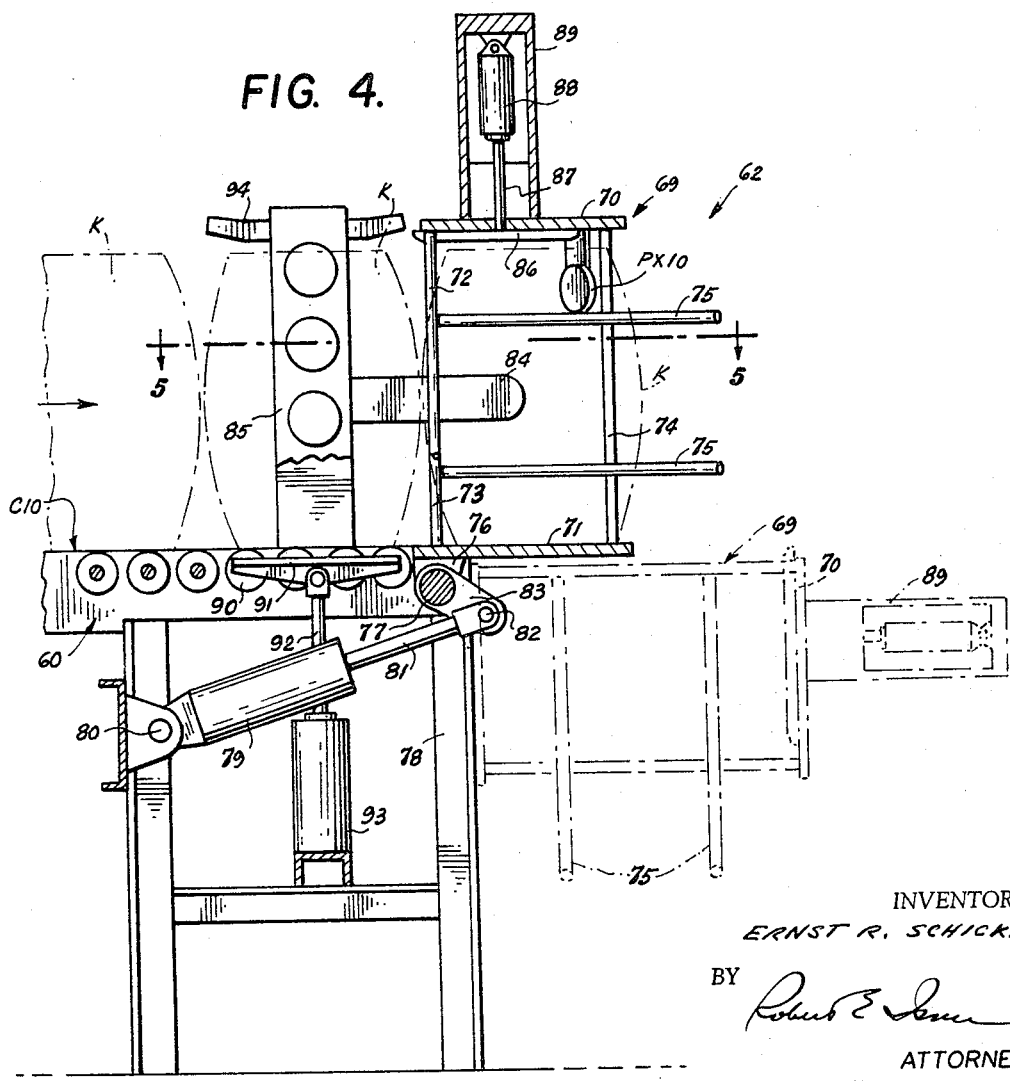
FIG. 4 is a vertical sectional view of one of the downending devices included in the apparatus of FIG. 2.

As shown particularly on FIGS. 4 and 5, downending device 62 includes a cradle 69 having generally triangular end plates 70 and 71 which are connected by bowed rods 72, 73 and 74. Curved guide rods 75 extend from rod 72 beyond rod 74. Rods 72 and 73 are spaced apart so that a key may enter cradle 69 therebetween, and rod 74 is spaced from rod 73 so that a key may roll therebetween along rods 75 for discharge from the cradle. End plate 71 has ears 76 extending therefrom and secured on a shaft 77 which is journalled in a frame 78 adjacent the end of conveyor C10. Shaft 77 has its axis extending transversely with respect to the direction of movement of kegs on conveyor C10 so that cradle 69 is swingable between an erect or vertical position, as shown in full lines on FIG. 4, at which the erect keg first in line on conveyor C10 can be propelled by the latter into the cradle, and a horizontal position, as shown in broken lines on FIG. 4, and at which the guide rods 75 extend alongside the upper ends of the respective inclined conveyor rails 66 (FIG. 2) so as to guide the discharged keg onto the latter.

Movement of cradle 69 between its erect and horizontal positions may be effected by a fluid pressure operated cylinder 79 suitably mounted on frame 78, as at 80, and having its ram 81 pivotally connected, as at 82, to an arm 83 secured on shaft 77. Thus, extension of ram 81 moves cradle 69 to its erect position, and retraction of ram 81 moves the cradle to its horizontal position.

When cradle 69 is in its erect position, a fixed guide tongue 84 (FIGS. 4 and 5) extends from one side of an inverted U-shaped overhead support 85 past rod 73 so that the distance from the free end of tongue 84 to guide rods 75 is less than the diameter of a keg K. Thus, as shown on FIG. 5, tongue 84 cooperates with rods 75 to limit the movement of a key into cradle 69 so long as the latter is in its erect position. However, when cradle 69 is moved away from its erect position, tongue 84 is withdrawn from between rod 73 and rods 75 and thus no longer blocks the space therebetween.

In order to prevent the discharge of a keg between rods 73 and 75 of cradle 69 until the latter has reached its horizontal position, downending device 62 further has a keg clamp 86 (FIG. 4) disposed at the inner side of end plate 70 which is uppermost in the erect position of the cradle. Keg clamp 86 is connected to the ram 87 of a fluid pressure operated cylinder 88 mounted in a support 89 extending outwardly from end plate 70 so that extension of ram 87 moves clamp 86 away from end plate 70 to clamp a keg in a cradle between clamp 86 and end plate 71. Conversely, retraction of ram 87 moves clamp 86 against end plate 70, as shown, to provide a space between clamp 86 and end plate 71 that is greater than the length or height of the keg, and thereby to release the latter.

As shown on FIGS. 4 and 5, conveyor C10 may be of the driven-roller type and its end adjacent downending device 62 has laterally spaced sets of rollers 90 between which a keg stop 91 is located. The keg stop 91 is mounted at the upper end of a vertically movable ram 92 of a fluid pressure operated cylinder 93 which is suitably carried by frame 78. Thus, when ram 92 is extended, stop 91 is moved upwardly to raise a keg located thereabove off driven rollers 90 and against an overhead abutment 94 carried by support 85.

The downending devices 63 and 64 are similar to the device 62 described above and includes cradles 69 which are pivotally mounted adjacent the ends of conveyors C11 and C12 for swinging movement between erect positions, at which the kegs first in line on the respective conveyors can be pushed into the cradles, and horizontal positions, at which kegs can be discharged from the cradles of devices 63 and 64 onto the inclined conveyor rails 67 and 68, respectively. Such swinging movements of the cradles 69 of devices 63 and 64 may be effected by fluid pressure operated cylinders 88, and keg stops 99 and 100 (FIG. 2) arranged adjacent the ends of conveyors C11 and C12 and corresponding to keg stop 91.

As shown on FIG. 3, the supplying of compressed air or other fluid under pressure from a suitable supply line (not shown) to the opposite ends of cylinders 79, 95 and 96 is controlled by solenoid valves SV27 and SV28, by solenoid valves SV29 and SV30, and by solenoid valves SV31 and SV32, respectively. The arrangement is such that solenoid valves SV27, SV29 and SV31, when energized, cause movement of cradles 69 of devices 62, 63 and 64, respectively, to their vertical keg receiving positions. Conversely, energizing of solenoid valves SV28, SV30 and SV32 causes movement of the cradles of the respective devices 62, 63 and 64 to their horizontal keg delivering positions.

As indicated in FIG. 2, cradles 69 of devices 62, 63 and 64 have proximity switches PX10, PX11 and PX12 respectively located therein so as to detect the presence of kegs in such cradles. The movements of keg clamps 86, 97 and 98 by fluid pressure operated cylinders 88 are under the control of solenoid valves SV33 and SV34, solenoid valves SV35 and SV36, and solenoid valves SV37 and SV38, respectively. The arrangement is such that keg clamps 86, 97 and 98 are moved to their closed or keg clamping positions in response to energizing of solenoid valves SV34, SV36 and SV38, respectively, and to their open or keg releasing positions in response to energizing of solenoid valves SV33, SV35 and SV37, respectively.

The downending devices 62, 63 and 64 are also provided with limit switches LS13, LS14 and LS15 (FIG. 2) which are actuated when the respective cradles 69 are in their horizontal or keg delivering positions, and with limit switches LS16, LS17 and LS18 which are actuated when the respective cradles are in their vertical or keg receiving positions.

The movements of keg stops 91, 99 and 100 between their inoperative or lowered and operative or raised positions by means of fluid pressure operated cylinders 93 are under the control of solenoid valves SV39 and SV40, solenoid valves SV41 and SV42 and solenoid valves SV43 and SV44, respectively (FIG. 3). The arrangement is such that keg stops 91, 99 and 100 are moved downwardly to their inoperative positions upon energization of solenoid valves SV39, SV41 and SV43, respectively, and conversely, such keg stops are moved upwardly to their operative positions upon energizing of the solenoid valves SV40, SV42 and SV44, respectively.

As shown on FIG. 3, the circuit for energizing solenoid valve SV27 includes a normally open contact LS13$b$ of limit switch LS13 in series with a normally closed contact PX10$a$ of proximity switch PX10. Similarly, the circuit for energizing solenoid valve SV29 has in series therewith a normally open contact LS14$b$ of limit switch LS14 and a normally closed contact PX11$a$ of proximity switch PX11, and the circuit for energizing solenoid valve SV31 has in series therewith a normally open contact LS15$b$ of limit switch LS15 and a normally closed contact PX12$a$ of proximity switch PX12. Thus, each of solenoid valves SV27, SV29 and SV31 is energized to effect upward swinging movement of cradle 69 of the respective device 62, 63 or 64 to its erect or keg receiving position whenever the cradle is in its horizontal position to actuate limit switch LS13, LS14 or LS15 and the cradle is empty, that is, the proximity switch PX10, PX11 or PX12 does not detect a keg in the cradle.

The circuit for energizing the motor MC10, 11, 12 by which keg delivery conveyors C10, C11 and C12 are driven is shown to include a manually closed switch SS3 and a normally open contact R6$a$ of a relay R6. In the circuit for energizing that relay R6, parallel, normally closed contacts PX10$c$, PX11$c$ and PX12$c$ of proximity switches PX10, PX11 and PX12, respectively, are connected in series with the relay so that the latter is energized to cause operation of conveyor motor MC10, 11, 12 when any one of the cradles is empty, as detected by the respective proximity switch.

The energizing circuits for solenoid valves SV39, SV41 and SV43 are shown to include normally closed relay contacts R7$a$, R8$a$ and R9$a$, respectively, and also the normally open limit switches LS16, LS17 and LS18, in series. Thus, when cradles 69 of downending devices 62, 63 and 64 all arrive at their erect positions adjacent the ends of delivery conveyors C10, C11 and C12, respectively, and thereby close limit switches LS16, LS17 and LS18, solenoid valves SV39, SV41 and SV43 are energized to effect downward movement of keg stops 91, 99 and 100 to their inoperative positions. When the keg stops are moved to their inoperative or lowered positions, the kegs first in line on delivery conveyors C10, C11 and C12 are free to be advanced by the latter into the erect cradles of the downending devices.

The circuits for energizing solenoid valves SV40, SV42 and SV44 are shown to include normally open contacts, PX10$b$, PX11$b$ and PX12$b$ of proximity switches PX10, PX11 and PX12, respectively. Thus, when the kegs first in line on delivery conveyors C10, C11 and C12 are advanced into the erect cradles 69 of devices 62, 63, and 64 and detected by proximity switches PX10, PX11 and PX12, contacts PX10$b$, PX11$b$ and PX12$b$ of the proximity switches are closed to energize solenoid valves SV40, SV42 and SV44 and thereby cause upward movement of keg stops 91, 99 and 100, respectively, thereby to hold the kegs next in line on conveyors C10, C11 and C12 against exerting continued pressure upon the kegs received in the erect cradles.

The coils of relays R7, R8 and R9 are seen to be connected in parallel with solenoid valves SV40, SV42 and SV44, respectively, so that, upon energization of such solenoid valves as described above, relays R7, R8 and R9 are also energized to open their contacts R7a, and R8a and R9a and thereby halt energizing of the solenoid valves SV39, SV41 and SV43, respectively.

The energizing circuit for solenoid valve SV34 is shown to have a normally closed contact LS13a of limit switch LS13 and the normally open proximity switch contact PX10b interposed in series therein. Similarly, the energizing circuit of solenoid valve SV36 has a normally closed contact LS14a of limit switch LS14 and proximity switch contact PX11b interposed in series therein, and the energizing circuit for solenoid valve SV38 has a normally closed contact LS15a of limit switch LS15 and the normally open proximity switch contact PX12b interposed in series therein. Thus, solenoid valves SV34, SV36 and SV38 are energized to move keg clamps 86, 97 and 98, respectively, to their closed or clamping positions when the cradles 69 are moved to their erect positions so as to release limit switches LS13, LS14 and LS15, and the kegs first in line on conveyors C10, C11 and C12 are advanced into the erect cradles so as to be detected therein by the proximity switches PX10, PX11 and PX12.

As shown, the circuit for energizing solenoid valve SV28 includes, in series therein, a normally closed contact R6b of relay R6, and normally closed switches constituted by photocells PC22 and PC23. A beam of light is aimed at photocell PC22 by a light source PL22 (FIG. 2) so that such bea mof light diagonally traverses the area on keg receiving section C12a of auxiliary delivery conveyor C13 which extends across the discharge ends of inclined conveyor rails 66, 67 and 68, Thus, the switch constituted by photocell PC22 will be closed only when no kegs are on the portion of conveyor section C13a traversed by the light beam directed at photocell PC22, that is, when there is a sufficiently clear space on conveyor section C13a to receive three spaced kegs from downending devices 62, 63 and 64. Further, as shown on FIG. 2, a light beam is directed at photocell PC23 across all three conveyor rails 66, 67 and 68 from a light source PL23 so that such light beam will be interrupted to open the switch constituted by photocell PC23 and thereby prevent energizing of solenoid valve SV28 whenever there is a jam-up of kegs on an yof inclined conveyor rails 66, 67 and 68. Energizing of solenoid valve SV28 is also prevented whenever relay R6 is energized to open its contact R6b by reason of the normal closing of any of proximity switch contacts PX10c, PX11c and PX12c.

However, when kegs have been advanced into all of the erect cradles to cause opening of all of proximity switch contacts of PX10c, PX11c, and PX12c, and thereby deenergize relay R6 for closing contact R6b thereof, and assuming that the switches constituted by photocells PC22 and PC23 are both in their normally closed positions, solenoid valve SV28 is energized to cause swinging of cradle 69 of downending device 62 to its horizontal position.

As shown, normally open contact LS13b of limit switch LS13 is also interposed in the energizing circuit for solenoid valve SV33. Thus, when cradle 69 of downending device 62 arrives at its horizontal position and actuates limit switch LS13 to close contact LS13b thereof, solenoid valve SV33 is energized to move keg clamp 86 to its open position and thereby permit the keg to roll from the cradle of downending device 62 onto inclined conveyor rails 66 for discharge from the latter onto conveyor section C13a.

The energizing circuit for solenoid valve SV30 also has limit switch contact LS13b interposed therein so that, when limit switch LS13 is actuated to close its contact LS13b in response to the arrival of the cradle of downending device 62 at its horizontal position, solenoid valve SV30 is energized to cause downward swinging of the cradle of downending device 63 from its erect position to its horizontal position. Since the energizing circuit for solenoid valve SV35 has the normally open limit switch contact LS14b interposed therein, the arrival of cradle 69 of downending device 63 at its horizontal position and the consequent actuation of limit switch LS14 to close its contact LS14b causes energization of solenoid valve SV35. Such energizing of solenoid valve SV35 moves keg clamp 97 to its open or released position, and thereby permits the keg to roll from the horizontal cradle of downending device 63 onto inclined conveyor rails 67 for discharge from the latter onto conveyor section C13a.

Since limit switch contact LS14b is also interposed in the energizing circuit for solenoid valve SV32, the arrival of the cradle of downending device 63 at its horizontal position causes energizing of solenoid valve SV32 and thereby causes downward swinging of the cradle of downending device 64 from its erect position to its horizontal position. The arrival of cradle 69 of downending device 64 at its horizontal position and the consequent actuation of limit switch LS15 causes closing of limit switch contact LS15b which is interposed in the energizing circuit for solenoid valve SV37. Thus, upon the arrival of the cradle of downending device 64 at its horizontal position, solenoid valve SV37 is energized to move keg clamp 98 to its open or released position and thereby permit the keg to roll from the horizontal cradle of downending device 64 onto inclined conveyor rails 68 for discharge therefrom onto conveyor section C13a.

As the keg rolls from the horizontal cradle of each of the downending devices 62, 63 and 64, the proximity switch contact PX10a, PX11a or PX12a is again closed for completing the energizing circuit of the solenoid valve SV27, SV29 or SV31. As each of valves SV27, SV29 and SV31 is energized, the related cradle is returned to its erect position adjacent the delivery conveyor C10, C11, or C12, whereupon the cycle of operation described above is repeated after the three kegs deposited on conveyor section C13a by the previous cycle of operation have been moved clear of the portion of that conveyor section scanned by photocell PC22. Thus, downending devices 62, 63 and 64 operate in sequence and repetitiously, so long as auxiliary conveyor C13 is running, to transfer successive kegs from erect positions on degrouping table 60 to prone positions on auxiliary conveyor C13. Since downending devices 62, 63 and 64 are operated in sequence and the inclined conveyor rails 66, 67 and 68 preferably extend parallel to each other at right angles to conveyors C10, C11 and C12 and to conveyor section C13a so as to have their discharge ends spaced apart along conveyor section C13a in the same order as said sequence, when considered in the direction opposite to the conveyor movement, the successive kegs deposited in prone positions on conveyor section C13a are spaced apart on the latter by distances at least as great as the distances between conveyor rails 66 and 67 and conveyor rails 67 and 68.

Referring again to FIG. 3, it will be seen that the energizing circuit for a motor MC13 by which auxiliary conveyor C13 is driven has a manually closed switch SS4 and the normally closed contact TD4a of a time delay relay TD4 interposed in series therein. The energizing circuit for time delay relay TD4 includes a photocell PC24 constituting a normally open switch. As shown on FIGS. 1 and 2, photocell PC24 is disposed adjacent the head of terminal section C13b of auxiliary conveyor 13 and a beam of light is aimed laterally across conveyor section C13b at photocell PC24 by a light source PL24. Thus, the switch constituted by photocell PC24 is intermittently closed to only intermittently energize time delay relay TD4 so long as the kegs transported past photocell PC24 are spaced apart along conveyor C13. Such intermittent energizing of time delay relay TD4 does not cause tripping thereof. However, if the rate of removal of kegs from terminal section C13b of auxiliary delivery conveyor C13 is less than the rate at which kegs are transferred to such conveyor by downending devices 62, 63 and 64, kegs will tend to back-up or have the spacing therebetween progressively reduced until the beam of light aimed from source PL24 at photocell PC24 is continuously interrupted by the kegs to cause continuous closing of the switch constituted by photocell PC24. The resulting continuous energization of time delay relay TD4 will cause the latter to trip or open its contact TD4a, and thereby halt operation of motor MC13. The resulting stoppage of auxiliary delivery conveyor C13 will cause one or more of the kegs previously delivered thereto by downending devices 62, 63 and 64 to remain in the section of the conveyor scanned by photocell PC22 and thereby prevent energization of solenoid valve SV28 for initiating the sequence of operation of the downending devices. Thus, the downending devices 62, 63 and 64 are repeatedly operated in sequence only so long as auxiliary conveyor C13 is continuously operated to remove kegs from the region of the discharge ends of inlined conveyor rails 66, 67 and 68.

If the cradles of devices 62, 63 and 64 remain in their erect positions due to the absence of a clear space on conveyor section C13a to receive kegs therefrom, the kegs in such erect cradles cause opening of proximity switch contacts PX10c, PX11c and PX12c to deenergize relay R6 and thereby halt the operation of conveyors C10, C11 and C12. If the kegs on conveyors C10, C11 and C12 extend back beyond photocells PC19 and PC21, the operation of conveyors C7, C8 and C9 will also be halted.

When the congestion of kegs on conveyor section C13b is relieved so that photocell PC24 no longer continuously detects a keg and conveyor C13 is again operated to carry kegs clear of the region of conveyor section C13a scanned by photocell PC22, the sequential operation of devices 62, 63 and 64 is automatically recommenced to transfer erect kegs from the ready supply on table 60 to prone, spaced apart positions on conveyor section C13a. When the empty cradles return to their erect positions, keg stops 91, 99 and 100 are lowered and conveyors C10, C11 and C12, which have been made operative in response to the emptying of the cradles, propel kegs into the erect cradles for sequential transfer to conveyor C13.

As indicated schematically on FIG. 1, the terminal sections C3b and C13b of the main and auxiliary delivery conveyors may extend parallel to each other in a zone Z5 and transfer devices or kickers 101 and 102 may be there provided for laterally pushing or kicking prone kegs from conveyor section C13b onto section C3b or from section C3b onto section C13b, as specifically disclosed in the previously mentioned application Ser. No. 526,784. Thus, kegs withdrawn from storage and transferred to delivery conveyor C13 by the apparatus 24 embodying this invention can be advanced along section C13b to keg feeder KF2 for feeding to washing apparatus 11, or all or some of the kegs removed from storage can be transferred from section C13b onto section C3b so as to be advanced by the latter to keg feeder KF1 for feeding to washing apparatus 10. The prone positions of the kegs on delivery conveyor C13 greatly facilitates such transferring of the kegs between conveyor sections C13b and C3b.

Although the apparatus Z4 embodying this invention has been described in connection with a particular system for handling kegs between the unloading docks and keg washers, it will apparent that such apparatus may be employed in any other environment in a brewery that requires erect kegs removed from storage, preferably in convenient groupings, to be transferred to prone, spaced apart positions on a delivery conveyor.

It is also to be noted that the invention is not limited to the precise embodiment thereof described in detail herein with reference to the accompanying drawings, and that various changes and modifications may be effected therein by one skilled in the art without departing from the scope or spirit of the invention, except as defined in the appended claims.

What is claimed is:

1. Apparatus for transferring kegs from storage to a delivery conveyor, comprising support means to receive erect kegs removed from storage in parallel rows, drive means operative to propel the kegs in said rows toward one end of said support means, downending means disposed in echelon arrangement at said one end of the support means, said downending means comprising an individual downending device for each of the respective rows of kegs thereon, each downending device including a cradle pivotally mounted to swing about an axis that extends transversely with respect to the rows of kegs between an erect position for receiving the erect keg first in line in each row under the propulsion of the drive means and a horizontal position at which the prone keg can roll laterally out of the cradle, guide means extending from said downending devices substantially at right angles to said rows and to a section of said delivery conveyor and defining paths spaced apart along said section to receive said prone kegs exiting from said cradles and direct the same onto said section of said delivery conveyor, control means to initiate operation of said downending means in response to the absence of kegs on said section of the delivery conveyor, and sequencing means included in said control means to effect movement of said cradles from said erect positions to said horizontal positions in a sequence which is the same as the order of the corresponding paths of said guide means along said section of the delivery conveyor considered in the direction opposed to the movement of the latter, thereby to ensure spacing apart of the kegs on said section of the delivery conveyor.

2. Apparatus for transferring kegs from storage to a delivery conveyor, comprising support means to receive erect kegs removed from storage in parallel rows, drive means operative to propel the kegs in said rows toward one end of said support means, downending means disposed at said one end of the support means and being operative to receive the erect keg first in line in each row and to transfer each received keg to a prone position for discharge from said downending means, said downending means comprising an individual downending device for each of the respective rows of kegs thereon, each said device including a cradle pivotally mounted at said one end of the support means in lateral registry with the respective row and being swingable between an erect position and a horizontal position, said cradle having a first opening which is at the top of the cradle in said horizontal position and which faces toward said support means in said erect position to permit the first keg in line in the respective row to enter the cradle through said first opening, said cradle further having a second opening which is generally at a side of the cradle in both said erect and horizontal positions and through which a keg can pass for discharge from the cradle, blocking means extending into said second opening of the cradle in said erect position to prevent discharge of a keg from the cradle in said erect position, guide means extending from said downending means to carry the prone kegs discharged from the latter onto a section of said delivery conveyor, and control means to initiate operation of said downending means in response to the absence of kegs on said section of the delivery conveyor.

3. Apparatus according to claim 2; wherein said downending device for each of said rows of kegs further includes clamping means carried by said cradle and operative to secure a keg in the latter during movement of the cradle from said erect position to said horizontal position.

4. Apparatus according to claim 3; further comprising control means for said clamping means including detecting means responsive to the presence of a keg in said cradle to cause said clamping means to secure said keg in the cradle so long as the latter is away from said horizontal position, and means responsive to the arrival of said cradle at said horizontal position to release said clamping means and thereby permit the previously secured keg to be discharged from the cradle through said second opening.

5. Apparatus according to claim 4; further comprising keg stop means for each of said rows of kegs on said support means and being located adjacent said one end of the latter, said stop means being movable from an inoperative position to an operative position where it holds the keg first in line in the respective row of kegs on said support means against movement by said drive means, and control means for said keg stop means moving the latter to said operative position in response to the entry of a keg into the cradle of the related downending device and returning said keg stop means to its inoperative position in response to the presence of the cradle in empty condition at said erect position thereof.

6. Apparatus according to claim 5; further comprising control means for said drive means effective to cause operation of the latter in response to the absence of a keg from said cradle of any of said downending devices.

7. Apparatus for transferring kegs from storage to a delivery conveyor, comprising support means to receive erect kegs removed from storage in parallel rows, drive means operative to propel the kegs in said rows toward one end of said support means, downending means disposed at said one end of the support means and being operative to receive the erect keg first in line in each row and to transfer each received keg to a prone position for discharge from said downending means, said downending means comprising a downending device for each of said respective rows of kegs thereon, each said device including a cradle pivotally mounted to swing between an erect position for receiving the keg first in line in the respective row under the propulsion of said drive means and a horizontal position at which the prone keg can roll laterally out of said cradle onto said guide means, keg stop means for each of said rows of kegs on said support means and being located adjacent said one end of the latter, said stop means being movable from an inoperative position to an operative position where it holds the keg first in line in the respective row of kegs on said support means against movement by said drive means, first control means for said keg stop means moving the latter to said operative position in response to the entry of a keg into the cradle of the related downending device and returning said keg stop means to its inoperative position in response to the presence of the cradle in empty condition at said erect position thereof, guide means extending from said downending means to carry the prone kegs discharged from the latter onto a section of said delivery conveyor, and second control means to initiate operation of said downending means in response to the absence of kegs on said section of the delivery conveyor.

8. Apparatus according to claim 7; further comprising control means for said drive means effective to cause operation of the latter in response to the absence of a keg from said cradle of any of said downending devices.

9. Apparatus according to claim 7; wherein said support means includes an outfeed section extending to said one end and an infeed section extending from the opposite end of the support means to said outfeed section, and said drive means includes first conveyor means operative to transport kegs along said infeed section to said outfeed section and second conveyor means operative to transport kegs along said outfeed section to said downending devices at said one end; and further comprising control means for said second conveyor means causing operation of the latter in response to the absence of a keg from said cradle of any of said downending devices, and control means for said first conveyor means causing operation of the latter in response to the presence of a relatively large empty space on said outfeed section of the support means and in response to the presence of a relatively smaller empty space on said outfeed section and the simultaneous presence of kegs on said infeed section adjacent said other end of the support means, thereby to move kegs from said infeed section to said outfeed section for providing room at said other end to receive additional kegs removed from storage.

References Cited
UNITED STATES PATENTS

| 2,441,469 | 5/1948 | Cameron | 198—79 |
| 2,725,137 | 11/1955 | Muddiman | 198—33 |

ROBERT G. SHERIDAN, *Primary Examiner.*